US009876642B2

(12) United States Patent
Bobinski et al.

(10) Patent No.: US 9,876,642 B2
(45) Date of Patent: Jan. 23, 2018

(54) METHOD FOR SECURELY TRANSMITTING A DIGITAL MESSAGE

(71) Applicant: DEUTSCHE POST AG, Bonn (DE)

(72) Inventors: Mike Bobinski, Bonn (DE); Jürgen Pabel, Köln (DE)

(73) Assignee: DEUTSCHE POST AG (DE)

( * ) Notice: Subject to any disclaimer, the term of this patent is extended or adjusted under 35 U.S.C. 154(b) by 269 days.

(21) Appl. No.: 14/649,653

(22) PCT Filed: Aug. 15, 2013

(86) PCT No.: PCT/EP2013/067088
§ 371 (c)(1),
(2) Date: Jun. 4, 2015

(87) PCT Pub. No.: WO2014/090423
PCT Pub. Date: Jun. 19, 2014

(65) Prior Publication Data
US 2016/0218871 A1    Jul. 28, 2016

(30) Foreign Application Priority Data

Dec. 12, 2012    (DE) .................... 10 2012 222 995

(51) Int. Cl.
*H04L 29/00*    (2006.01)
*H04L 9/08*    (2006.01)
(Continued)

(52) U.S. Cl.
CPC .......... *H04L 9/0863* (2013.01); *H04L 9/0825* (2013.01); *H04L 9/3263* (2013.01);
(Continued)

(58) Field of Classification Search
CPC .... H04L 9/0863; H04L 9/0825; H04L 9/3263
(Continued)

(56) References Cited

U.S. PATENT DOCUMENTS 7,970,135 B1 *   6/2011   Schwenk ............. H04L 9/0841
                                                380/277
8,353,016 B1 *   1/2013   Pravetz .................. G06F 21/36
                                                715/749
2006/0235703 A1 *  10/2006  Wendenburg ......... H04L 9/3263
                                                713/176

FOREIGN PATENT DOCUMENTS

WO    03050774 A1    6/2003
WO    2006078558 A2  7/2006

OTHER PUBLICATIONS

"De-Mail Sicherer Elektronicher Datenverkehr—Einfach Und Nachweisbar" Bundesamt Für Sicherheit in Der Informationstechnik, Mar. 12, 2012, pp. 1-28.

(Continued)

*Primary Examiner* — Anthony Brown
*Assistant Examiner* — Michael D Anderson
(74) *Attorney, Agent, or Firm* — Tarolli, Sundheim, Covell & Tummino LLP

(57) ABSTRACT

A method is provided for securely transmitting a digital message that is transmitted by means of an electronic letter service. A user of the service has a computer with a functioning browser and an Internet connection, and the electronic letter service makes use of a TrustCenter. The user creates a password using his/her browser. A user password verifier is cryptographically derived from the password. The user password verifier is transmitted to the electronic letter service and stored on a storage medium. A user secret is generated from the password by means of a cryptographic derivation. The user secret constitutes the symmetrical key for the encryption of a user-specific user master secret. The user secret is encrypted using the public key of the Trust-Center and the encrypted user secret is transmitted to the electronic letter service, from where it is then forwarded to the TrustCenter.

15 Claims, 6 Drawing Sheets

Figure 1:
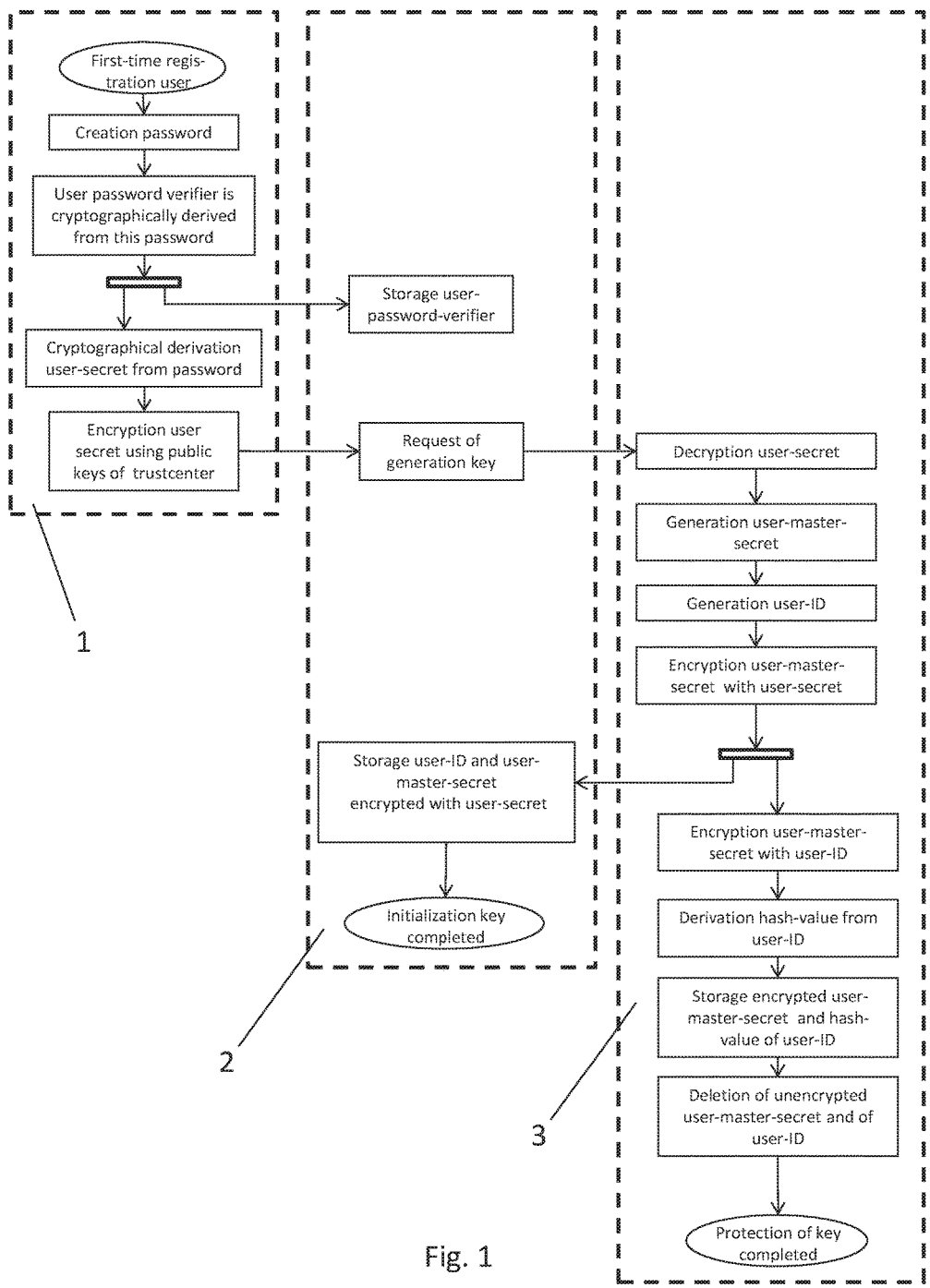

(51) Int. Cl.
 *H04L 29/06* (2006.01)
 *H04L 12/58* (2006.01)
 *H04L 9/32* (2006.01)

(52) U.S. Cl.
 CPC .......... *H04L 51/08* (2013.01); *H04L 63/0442* (2013.01); *H04L 63/062* (2013.01); *H04L 2463/061* (2013.01)

(58) Field of Classification Search
 USPC ....................................................... 713/156
 See application file for complete search history.

(56) References Cited

OTHER PUBLICATIONS

"Trust Center Pocket Guide 2011" Bundesdruckerei, Aug. 31, 2011, pp. 1-38.
International Search Report for PCT/EP2013/067088, dated Nov. 15, 2013, pp. 1-17.

\* cited by examiner

METHOD FOR SECURELY TRANSMITTING A DIGITAL MESSAGE

RELATED APPLICATIONS

The present invention is a U.S. National Stage under 35 USC 371 patent application, claiming priority to Serial No. PCT/EP2013/067088, filed on 15 Aug. 2013; which claims priority from German Application No. 10 2012 222 995.7, filed 12 Dec. 2012, the entirety of both of which are incorporated herein by reference.

The invention relates to a method for securely transmitting a digital message.

Nowadays, information can be sent digitally, for example, as e-mail. In this context, for various reasons, e-mail transmission is not suitable for confidential information. For one thing, neither the sender nor the recipient can be unequivocally identified. This means that the recipient of an e-mail cannot be certain whether the sender is indeed the person or institution that is indicated as the sender. Secondly, the information is transmitted openly, which means that misdirected mail can be read by the erroneous recipient. In addition, the provider of the e-mail function via whose server the e-mail is transmitted can access the information from the e-mail.

In order to remedy these problems, secure services for the electronic transmission of information are currently being established by various providers. For example, with its E-letter (E-Postbrief), the applicant is offering a method for securely transmitting digital information. The sender as well as the recipient have to authenticate themselves securely one time, for example, personally. For this purpose, during the registration, a PostIdent proof of identity is required, that is to say, the personal presentation of a picture ID at a branch of the postal service. Within the scope of the registration, a six-digit transaction number is sent by SMS to the mobile phone of the intended user by means of a mobile TAN (mTAN) procedure. This procedure is also employed when the E-letter portal (E-Postbrief-Portal) is being used. For purposes of unambiguous identification of the user, the main domicile is subsequently confirmed by another delivery of a six-digit mobile TAN as well as by the entry of a one-time six-digit address TAN that is delivered by regular mail and entered in the E-letter portal. The E-letter itself is a hybrid postal service with an associated website. Via an encrypted web portal, electronic messages can be sent as online letters between customers of the E-letter service. For encryption purposes, conventional methods are used such as, for example, the Secure-Sockets-Layer-(SSL) encryption method.

The E-letter portal secures the communication between the user and the operator by means of an HTTPS (HyperText Transfer Protocol Secure) encryption. Therefore, the transport channel is encrypted, whereby this encryption does not extend to the message. If the message is present in plain text, then it is also received in plain text on the portal server.

Persons in certain occupations have to keep the professional secrets that have been entrusted to them secret vis-à-vis third parties. Doctors and attorneys, for example, fall under these professions. Consequently, these persons whose professions fall under the duty of confidentiality are not allowed to use a service such as the E-letter for sending such information. However, the legal opinion exists that so-called end-to-end encryption technologies are allowed to be used for communication by persons whose professions fall under the duty of confidentiality. The fundamental principle of end-to-end encryption is that the sensitive message is cryptographically secured with a key known only to the parties involved in the communication. The recipient has to inform the sender of this key before the message is sent. There are already various solutions on the market that allow parties to a communication to implement an end-to-end encryption. However, these solutions always presuppose that the recipient autonomously manages and protects his/her own key and that he/she provides the sender with access to the key that is needed for the encryption. Fundamentally, symmetrical and asymmetrical encryption methods are known. In symmetrical encryption methods, the encryption and the decryption are carried out using the same key. If a sender sends a message that is encrypted using a symmetrical method, and if the recipient is supposed to be able to decrypt this message once again, then the latter has to have access to the same key. Other methods, in which the two keys are not identical but can easily be calculated from each other, are likewise considered to be symmetrical methods. In contrast, the asymmetrical methods include the public-key encryption methods. This is an asymmetrical encryption method in which a public key is used to convert a plain text into a secret text so that the plain text can be obtained from it once again, by using a secret key. Here, the public key is not secret. With symmetrical methods, in contrast, the forwarding to the sender has to take place via a secure channel.

Moreover, with the existing solutions, it is always presupposed that the recipient installs at least software modules on his/her terminal device. Often, additional devices are also needed in order to decrypt an encrypted message.

The objective of the invention is to put forward a method for securely transmitting a digital message, said method safeguarding the security properties of an end-to-end encryption, but without needing the usually necessary technology resources and requisite organizational measures on the part of the recipient, in particular, without additional devices or PC equipment such as, for example, a card reader or an NFC (near field communication) module on the part of the recipient.

According to the invention, this objective is achieved by a method having the features of the independent claim 1. Advantageous refinements of the method can be gleaned from the subordinate claims 2 to 15.

The method according to the invention for securely transmitting a digital message by means of an electronic letter service presupposes that the user of the service has a computer with a functioning browser running on it as well as an Internet connection, and that the electronic letter service makes use of a TrustCenter, whereby an asymmetrical encryption method is installed on the TrustCenter. The term computer as used here and below refers to any computer that can communicate with the Internet, for which purpose a browser is installed on the computer in order to display pages from the Internet. The term TrustCenter as used here and below refers to a reliable third party that generates and securely administers keys according to the state of the art. TrustCenters are subject to their own standards and are regularly inspected by the German Federal Office for Information Security. Moreover, the user has an unambiguous user name with which he/she logs on to the electronic letter service.

First of all, the user creates a password using his/her browser. A user password verifier is cryptographically derived from the password. This user password verifier constitutes data for the authentication of the user of the electronic letter service. A hash method, for instance, can be used for the cryptographic derivation. Here, via a so-called hash function, a character string having a fixed length is generated from a character string having a random length. For a given output value of a hash function, it is practically impossible to find an input value that is represented by the hash function. Moreover, for a given value, it is practically impossible to find a second value that is different from it and that yields the same hash value, and by the same token, it is practically impossible to find two different input values that yield the same hash value. The user password verifier is transmitted to the electronic letter service and stored on a storage medium of the electronic letter service, for example, in a database. A user secret is cryptographically derived from the password. Here, the user secret constitutes the symmetrical key for the encryption of a user-specific message key. The user secret is encrypted using the public key of the TrustCenter and the encrypted user secret is transmitted to the electronic letter service, from where it is then forwarded to the TrustCenter, whereby the electronic letter service sends to the TrustCenter a function call for the generation of a user master secret. The user secret is decrypted in the TrustCenter and a user master secret is generated. Moreover, a user ID is generated in the TrustCenter, whereby the user ID constitutes unambiguous identity data that is used to allocate the appertaining user master secret between the electronic letter service and the TrustCenter. The TrustCenter knows only the user ID, but not the allocation to the user name that is associated with it in the electronic letter service. Then the user master secret is encrypted with the user secret in the TrustCenter, and the user ID as well as the user master secret encrypted with the user secret are transmitted from the TrustCenter to the electronic letter service, where the user ID and the user master secret encrypted with the user secret are stored.

This method ensures that the electronic letter service cannot acquire any knowledge about the user master secret and functions merely as an administrator for purposes of storing the encrypted user master secret and a non-secret certificate. This certificate can be completely anonymous or, as an alternative, it can contain recipient data such as, for example, a digital recipient address, a physical address of the recipient and/or other personally identifiable information.

In an advantageous embodiment of the method according to the invention, after the encryption of the user master secret with the user secret in the TrustCenter, the user master secret is encrypted with the user ID in the TrustCenter, and subsequently a hash value is derived from the user ID in the TrustCenter; after this, the encrypted user master secret and the hash value derived from the user ID are stored in the TrustCenter. Subsequently, the unencrypted user master secret and the user ID are deleted in the TrustCenter.

It has proven to be advantageous for the electronic letter service to be accessible via a portal on the Internet. The portal can be a login mask into which the user name and a user password can be entered.

In an advantageous embodiment, the transmission of the user name and of the user password verifier from the computer of the user to the electronic letter service is carried out by means of a challenge-response-based method. Here, a challenge-response-based method is a secure password-based authentication and key exchange protocol. In another advantageous embodiment, the SRP (Secure Remote Password) method is used as a challenge-response-based method for the transmission of the user name and of the user password verifier from the computer of the user to the electronic letter service. This method ensures that the electronic letter service can no longer discover the user password since, within the scope of the initialization, that is to say, the registration and authentication—the login—it is not transmitted to the electronic letter service. Exclusively cryptographic derivations of the user password are transmitted by the browser. Thus, the user password constitutes a secret that is known exclusively to the portal user.

In order to ensure a separation between the key administration and the data storage, the key administration is delegated to a third party outside of the electronic letter service. This ensures that no party can autonomously gain access to keys and data.

Password changes by the user are possible in the embodiment of the method according to the invention presented below.

Password changes are exclusively possible when the user is logged in, when the browser already has access to the user master secret. The user first uses his/her browser to enter the new password and to validate it. Subsequently, in the browser of the user, a user password verifier is cryptographically derived from the new password, after which it is transmitted to the electronic letter service and stored on a storage medium of the electronic letter service, a process in which the old user password verifier is replaced. Then the encrypted user master secret is retrieved by the electronic letter service- and transmitted by the latter to the browser on the computer of the user. Then a new user secret is cryptographically derived from the new password, after which the user master secret is decrypted with the old user secret and then encrypted again with the new user secret. The newly encrypted user master secret is now transmitted to the electronic letter service, where it is stored on a storage medium, a process in which the old user master secret is replaced.

A password change leads to a different user secret since it is derived directly from the user password. When the password is changed, the user master secret is encrypted with the new user secret in the browser and transmitted to the electronic letter service in order to be stored. An interaction with the TrustCenter is not necessary.

If a user of the electronic letter service no longer knows the current password, for example, because he/she has forgotten it, or if the authentication of the user of the electronic letter service by means of this password is blocked, for instance, after three incorrect entries, then the user can no longer log in with this password. Since the user secret derived from this password cannot be calculated without this password, the encrypted user master secret of the user that is stored in the user database of the electronic letter service can no longer be decrypted. In this case, a key recovery procedure has to be initiated if the user wants to access encrypted message contents that he/she has already received.

In order to allow a key recovery, the generated data of the TrustCenter is not discarded but rather it is stored securely. In this context, the TrustCenter itself does not have any information that would identify the person associated with the generated data. The newly generated user master secret is encrypted with the user ID and the result is stored in a database, indicating a hash value of the user ID. Resetting the password can be done with a method according to the following embodiment: using his/her browser, the user requests an unlocking password from the electronic letter service. An unlocking password is cryptographically generated in the electronic letter service and it is delivered to the user by regular mail. Once the user has received this unlocking password, he/she can once again log in to the portal of the electronic letter service. Here, the unlocking password is transmitted to the electronic letter service. If the unlocking password has been entered correctly, feedback is sent by the electronic letter service to the browser of the user indicating that the unlocking password is correct, and a prompt to enter a new password in the browser of the user is displayed. Otherwise, feedback is sent by the electronic letter service to the browser of the user indicating that the unlocking password is not correct, and the procedure is aborted or the user is once again prompted to enter the correct unlocking password, whereby the procedure is aborted, for example, after three incorrect entries. If the entry of the unlocking password was successful, then the user can use his/her browser to enter a new password and to validate it. Subsequently, a new user password verifier is cryptographically derived from the new password, followed by the transmission of the user password verifier to the electronic letter service, where the user password verifier—which replaces the old user password verifier—is stored on a storage medium. Now a new user secret is cryptographically derived from the new password in the browser of the user and encrypted using the public key of the TrustCenter and subsequently transmitted to the electronic letter service. Then a request for key recovery with the user ID of the user is transmitted by the electronic letter service to the TrustCenter, where a hash value is derived from the user ID. Subsequently, the encrypted user master secret is sought using the hash value of the user ID in the TrustCenter and, after having been found, it is decrypted with the user ID in the TrustCenter. The new user secret is decrypted in the TrustCenter using the private key of the TrustCenter and the user master secret is encrypted with the new user secret in the TrustCenter. Then the newly encrypted user master secret is transmitted by the TrustCenter to the electronic letter service, where it replaces the old encrypted user master secret. Finally, the newly encrypted user master secret is transmitted by the electronic letter service to the browser.

For the transmission of the secret message, a message with an encrypted attachment in a digital message that has been transmitted by means of a secure transmission can be selected, whereby the secret message is contained in the attachment. Such an encrypted attachment can be displayed in that the message is displayed in the browser of the user, whereby the user is informed whether the message contains an attachment. The user requests the attachment from the electronic letter service, after which the encrypted attachment is transmitted by the electronic letter service to the computer of the user. There, the encryption is recognized by the browser of the user and the encrypted user master secret is requested from the storage medium of the electronic letter service. After the encrypted user master secret has been transmitted from the storage medium of the electronic letter service to the computer of the user, the user master secret is decrypted with the user secret in the browser of the user, and then the attachment is likewise decrypted with the user master secret in the browser of the user, and the attachment is displayed in plain text in the browser of the user.

As an alternative, the entire message can be encrypted. In this case, at first, only the unencrypted message header is displayed in the browser of the user. The message itself is identified as being encrypted, after which the encrypted user master secret from the user data is retrieved by the electronic letter service. The user master secret is decrypted with the user secret in the browser of the user and then the message is decrypted with the user master secret so that the message can subsequently be displayed in plain text.

As an alternative, an asymmetrical or a symmetrical key can be used for the encryption of the message. In the case of the alternative with the asymmetrical encryption, for each recipient, an asymmetrical pair of keys of his/her own is generated and the public key is supplied to the sender in a certificate. Recipient master data is stored in the electronic letter service, whereby the public key is provided with the certificate in the TrustCenter, and this certificate, together with the encrypted user master secret, is forwarded by the TrustCenter to the electronic letter service, where is it stored in the recipient master data. The sender encrypts the sensitive document while it is still within his/her sphere of control, before sending it via the electronic letter service. The encrypted document is transmitted in encrypted form to the recipient on his/her browser and thus in his/her sphere of control, and it is only decrypted once it is there. In this context, the electronic letter service—as the transport medium of the messages—cannot access the private keys that are being used and therefore cannot read the protected message. This ensures that persons whose professions fall under the duty of confidentiality do not disclose their professional secrets to third parties, not even to the electronic letter service.

The alternative method with a symmetrical message encryption makes lesser demands on the capability of the computers employed. Since the user master secret in this scenario is a symmetrical key instead of an asymmetrical key, there is no non-sensitive counterpart in the sense of a public key. The user sender secret takes over the function of the public key with the certificate provided by the sender, whereby this user sender secret is calculated from the sender ID and from the user master secret that was stored for the submitted user ID.

For the decryption of the symmetrically encrypted message, the sender ID as meta data, along with the encrypted message, is supplied by the system of the sender to the system of the recipient, where the user sender secret is derived from the user master secret and from the sender ID. Subsequently, the message itself is decrypted with the user sender secret, so that it can then be displayed in plain text in the browser of the recipient. Here, the cryptographic derivation is carried out analogously to the provision of the user sender secret in the TrustCenter. Since, as a result, the user sender secret is only reconstituted within the sphere of control of the recipient, it is never present in decrypted form in the electronic letter service. Consequently, the method likewise meets the prerequisites for message transmission for persons whose professions fall under the duty of confidentiality.

Additional advantages, special features and practical refinements of the invention can be gleaned from the subordinate claims and from the presentation below of preferred embodiments making reference to the drawings.

Figure 2:
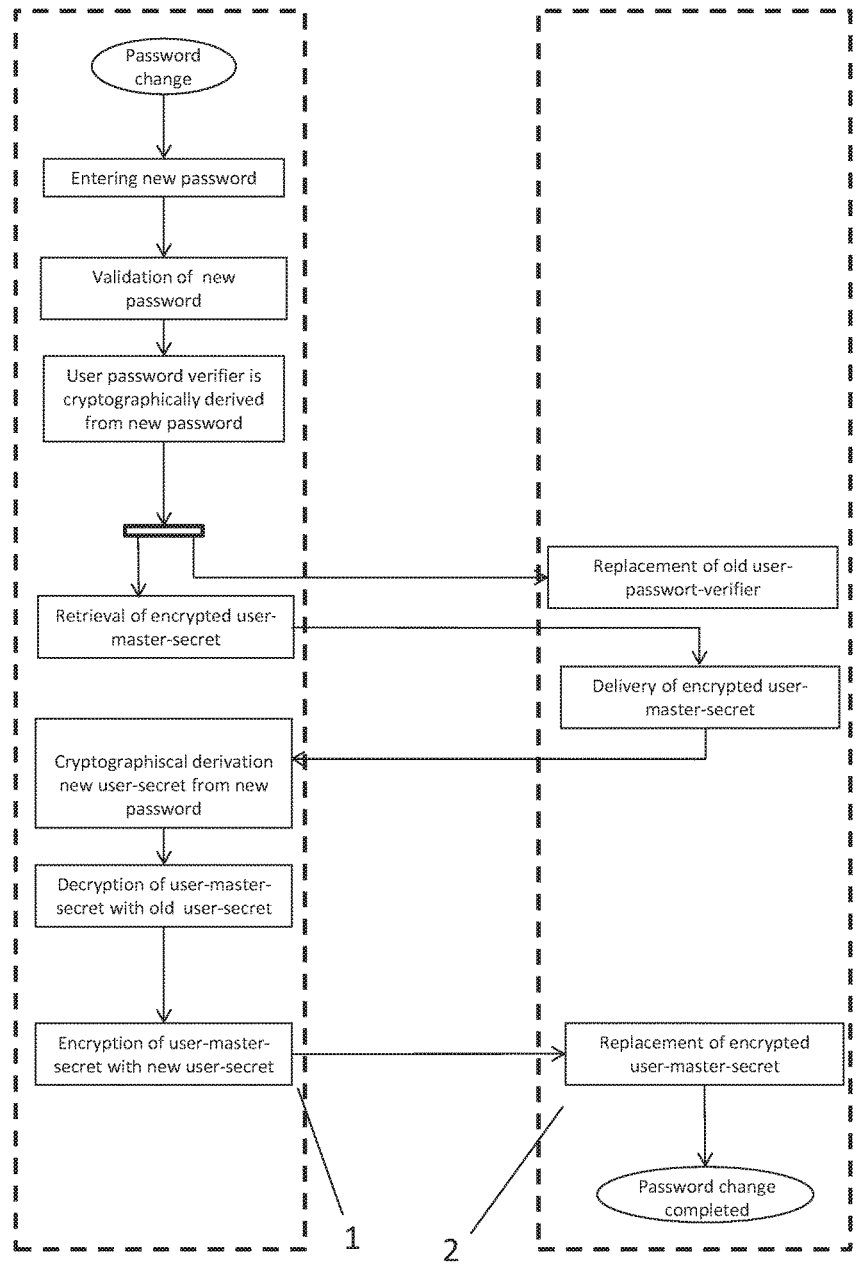
Figure 3:
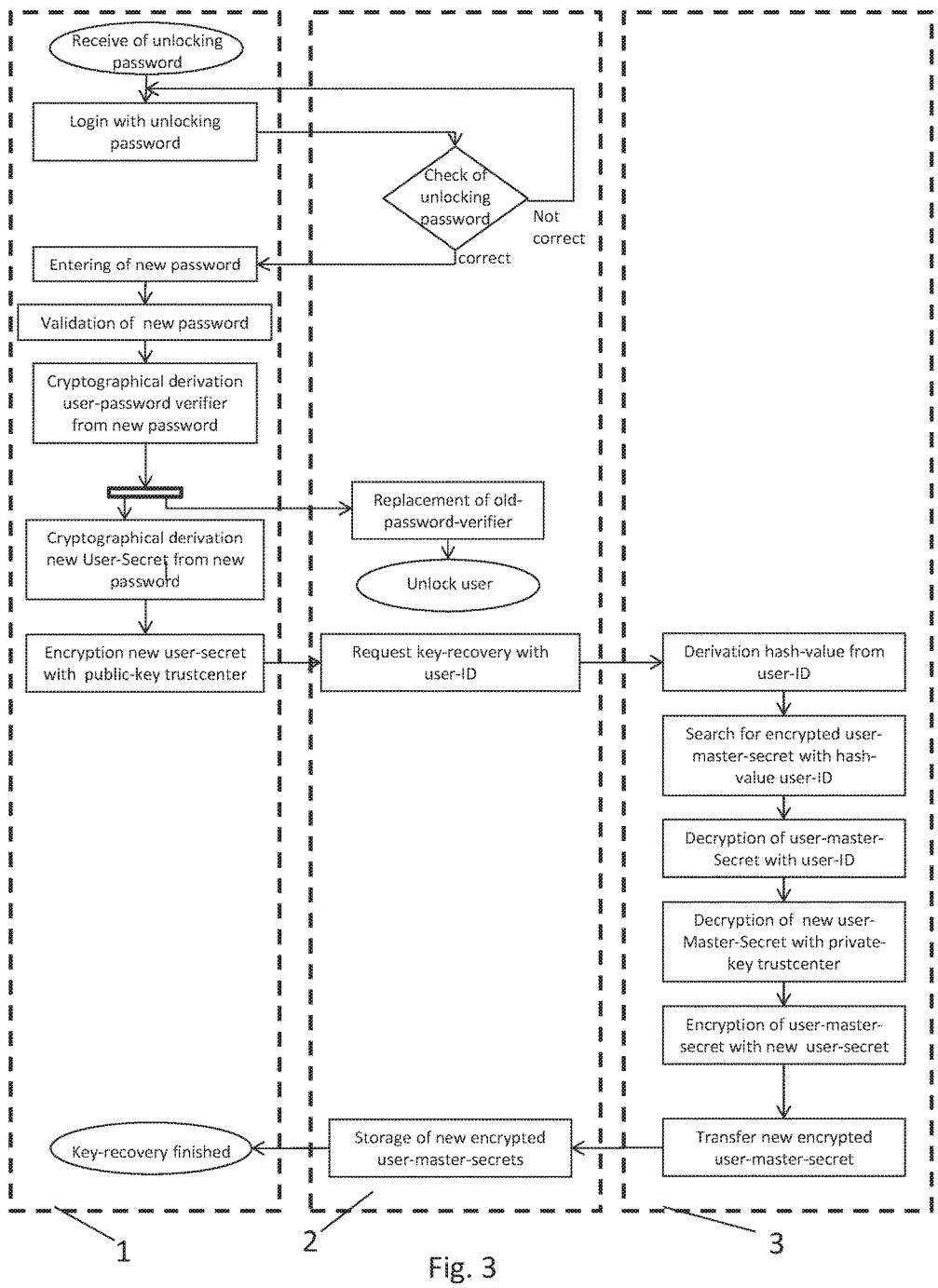
Figure 4:
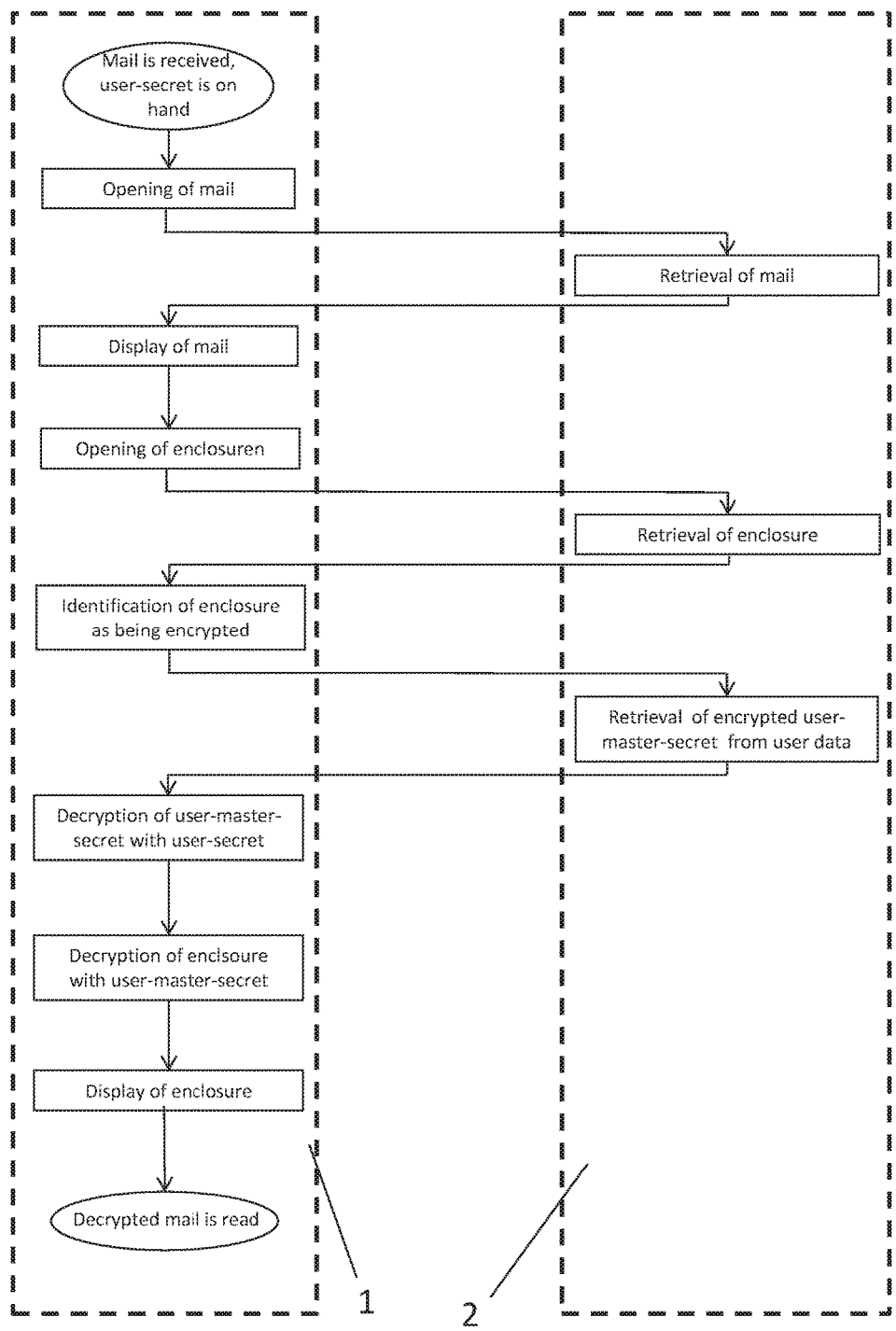
Figure 5:
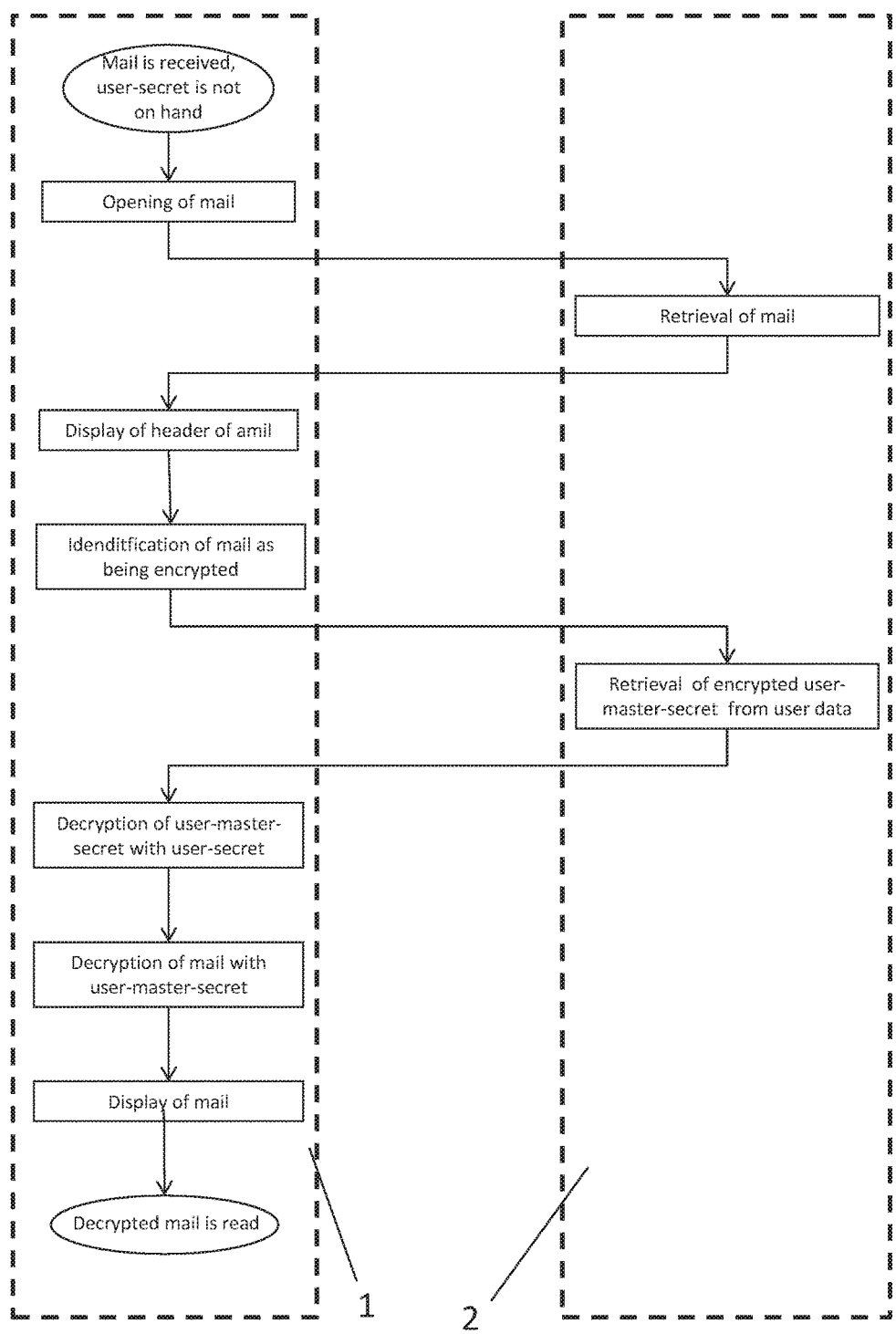
Figure 6:
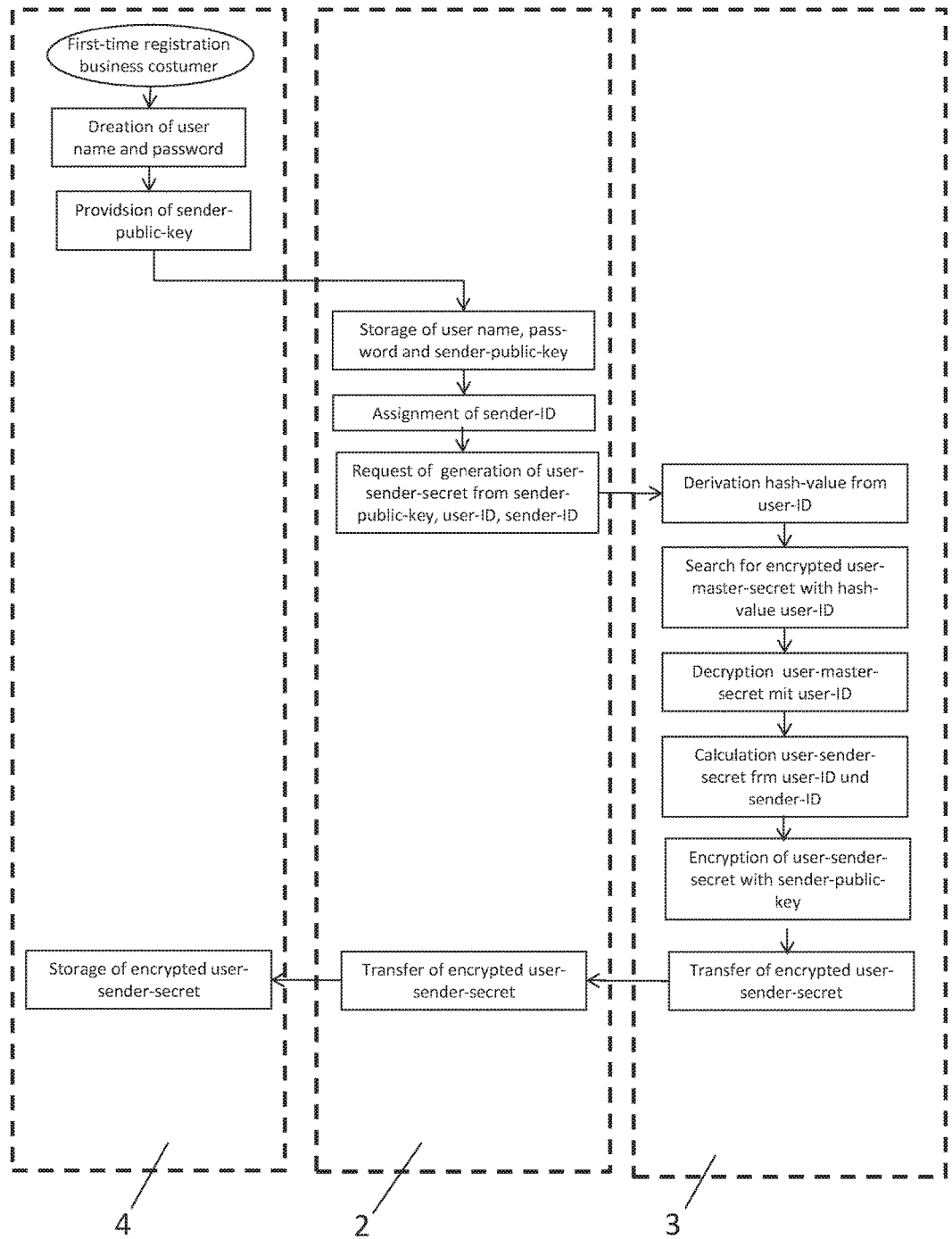

The drawings show the following:

FIG. 1 a flow chart for securing the key,

FIG. 2 a flow chart for changing the password,

FIG. 3 a flow chart for a key recovery procedure,

FIG. 4 a flow chart for displaying an encrypted attachment in plain text when only the attachment of the message is encrypted, FIG. 5 a flow chart for displaying an encrypted message in plain text when the entire message is encrypted, FIG. 6 a flow chart for making a user sender secret available.

As shown in FIG. 1, the key administration is delegated to a third party outside of the electronic letter service 2, namely, a TrustCenter 3. This ensures that the key administration is separated from the data storage and that no party can, on its own, gain access to keys and data.

The user of the electronic letter service has a system 1 with a computer, with a functioning browser running on it and with an Internet connection.

The user has an unambiguous user name with which he/she logs on to the electronic letter service. This user name is assigned during the first-time registration for the electronic letter service.

During the first-time registration, the user creates a password using his/her system 1. A user password verifier is cryptographically derived from this password. This user password verifier constitutes data for the authentication of the user of the electronic letter service 2. The user password verifier is transmitted to the electronic letter service 2, where it is stored in a database. A user secret is cryptographically derived from the password. Here, the user secret constitutes the symmetrical key for the encryption of a user-specific user master secret. The user secret is encrypted using the public keys of the TrustCenter 3 and the encrypted user secret is transmitted to the electronic letter service 2, from where it is then forwarded to the TrustCenter 3, whereby the electronic letter service 2 sends to the TrustCenter 3 a function call for the generation of a user master secret. Any reliable third party that offers such services can function as the TrustCenter 3. Advantageously, such a TrustCenter 3 is to be found within the corporate group of the applicant in the form of Signtrust. Using Signtrust as the TrustCenter 3 and the E-letter offered by the applicant as the electronic letter service 2 simplifies the organizational sequence since the electronic letter service 2 uses the TrustCenter 3 and consequently, has to enter into an appertaining contractual agreement with the TrustCenter 3. In the TrustCenter 3, the user secret is decrypted and a user master secret is generated. Moreover, a user ID is generated in the TrustCenter 3, whereby the user ID constitutes unambiguous identity data that is used to allocate the appertaining user master secret between the electronic letter service 2 and the TrustCenter 3. The TrustCenter 3 knows only the user ID, but not the allocation to the user name that is associated with it in the electronic letter service 2. Subsequently, in the TrustCenter 3, the user master secret is encrypted with the user secret and then the user ID as well as the user master secret encrypted with the user secret are transmitted from the TrustCenter 3 to the electronic letter service 2, where the user ID and the user master secret encrypted with the user secret are stored.

The sender likewise has a system 4 with a computer and an Internet connection. The sender encrypts the sensitive document in his/her system 4 and thus while it is still within his/her sphere of control, before sending it via the electronic letter service 2. In this context, the sender, as a person whose profession swears him/her to secrecy, is usually a business customer of the electronic letter service 2. The encrypted document is transmitted in encrypted form to the recipient on his/her system 1 and thus into his/her sphere of control when he/she reads the message, and it is only decrypted once it is there. In this context, the electronic letter service 2—as the transport medium of the messages—cannot access the private keys that have been used and therefore cannot read the protected attachments. This ensures that persons whose professions fall under the duty of confidentiality do not disclose their professional secrets to third parties, not even to the electronic letter service 2.

The user secret calculated from the user password is encrypted in the system of the user 1 using the public key of the TrustCenter 3 within the scope of the user initialization, for example, during the registration of the system of the user 1. The encrypted user secret is transmitted to the electronic letter service 2 in order to be forwarded to the TrustCenter 3. The electronic letter service 2 implements a function call to the TrustCenter 3, so that the latter generates a new user master secret. The function call contains only the user secret that has been encrypted using the public key of the TrustCenter 3. The TrustCenter 3 decrypts the user secret and symmetrically encrypts the newly generated user master secret that is returned to the electronic letter service 2, along with information about a user ID generated by the TrustCenter 3 and about the associated certificate. The electronic letter service 2 stores these values in the user database as an attribute in the user account that is to be registered.

This method ensures that the electronic letter service 2 cannot acquire any knowledge about the user master secret and functions merely as an administrator for purposes of storing the encrypted user, master secret and the non-secret certificate.

After the encryption of the user master secret with the user secret in the TrustCenter 3, the user master secret is encrypted with the user ID in the TrustCenter 3, and subsequently a hash value is derived from the user ID in the TrustCenter 3; after this, the encrypted user master secret and the hash value derived from the user ID are stored in the TrustCenter 3. Subsequently, the unencrypted user master secret and the user ID are deleted in the TrustCenter 3.

The electronic letter service 2 is accessible via a portal on the Internet. The portal provides a login mask into which the user name and a user password can be entered.

The user name and the user password verifier are transmitted from the system 1 of the user to the electronic letter service 2 by means of the SRP method as a challenge-response-based method. This method ensures that the electronic letter service 2 can no longer discover the user password since, within the scope of the initialization, that is to say, the registration and authentication—the login—it is not transmitted to the electronic letter service 2. Exclusively cryptographic derivations of the user password are transmitted by the system 1 of the user. Thus, the user password is a secret that is exclusively known to the portal user.

The user secret is calculated from the user password at the point in time of the processing in the system 1 of the user, so that no separate initialization is required. The user secret calculated from the user password is encrypted in the system 1 using the public key of the TrustCenter 3, for example, the Signtrust public key, within the scope of the user initialization, for example, during the registration of the system 1. The encrypted user secret is transmitted to the E-letter system 2 in order to be forwarded to Signtrust 3. The E-letter system 2 implements a function call to Signtrust 3 so that the latter generates a new user master secret. The function call contains only the user secret that has been encrypted using the Signtrust public key. Signtrust 3 decrypts the user secret and symmetrically encrypts the newly generated user master secret that is returned to the E-letter system 2, along with information about a user ID generated by Signtrust 3 and about the associated certificate. The E-letter system 2 stores these values in the user database as an attribute in the user account that is to be registered.

This method ensures that the E-letter system 2 cannot acquire any knowledge about the user master secret and functions merely as an administrator for purposes of storing the encrypted user master secret and the non-secret certificate.

In order to allow a key recovery, the generated data of Signtrust 3 is not discarded but rather, it is stored securely. In this context, Signtrust 3 itself does not have any information that would identify the person associated with the generated data. The newly generated user master secret is encrypted with the user ID and the result is stored in a database, indicating a hash value of the user ID.

Password changes by the user are possible according to a method as shown in the flow chart of FIG. 2.

Password changes are exclusively possible when the user is logged in, when the system 1 of the user already has access to the user master secret. A password change leads to a different user secret since it is derived directly from the user password. When the password is changed, the user master secret is encrypted with the new user secret in the system 1 of the user and transmitted to the E-letter system 2 in order to be stored in the E-letter user database. An interaction with the TrustCenter 3 is not necessary.

The user first uses his/her system 1 to enter the new password and to validate it. Subsequently, in the system 1 of the user, a user password verifier is cryptographically derived from the new password, after which it is transmitted to the E-letter system 2 and stored in a database of the E-letter system, a process in which the old user password verifier is replaced. Then the encrypted user master secret is retrieved by the electronic letter service 2 and transmitted by the latter to the system 1 of the user. Then a new user secret is cryptographically derived from the new password, after which the user master secret is decrypted with the old user secret and then encrypted again with the new user secret. The newly encrypted user master secret is now transmitted to the E-letter system 2 where is it stored in a database, a process in which the old user master secret is replaced.

FIG. 3 describes the method for resetting the password or for key recovery. If a user of the E-letter system 2 no longer knows the current password, for example, because he/she has forgotten it, or if the authentication of the user of the E-letter system 2 by means of this password is blocked, for instance, after three incorrect entries, then the user can no longer log in with this password. Since the user secret derived from this password cannot be calculated without this password, the encrypted user master secret of the user that is stored in the user database of the E-letter system 2 can no longer be decrypted. In this case, a key recovery procedure has to be initiated, since otherwise the user will no longer be able to access the encrypted message contents that he/she has already received.

In order to allow a key recovery, the generated data of Signtrust 3 is not discarded but rather it is stored securely. In this context, Signtrust 3 itself does not have any information that would identify the person associated with the generated data. The newly generated user master secret is encrypted with the user ID and the result is stored in a database, indicating a hash value of the user ID. Resetting the password can be done with a method according to the following embodiment: using his/her system 1, the user requests an unlocking password from the E-letter system 2. The E-letter system 2 cryptographically generates an unlocking password and delivers it to the user by regular mail. Once the user has received this unlocking password, he/she can once again log in to the portal of the E-letter system 2. Here, the unlocking password is transmitted to the E-letter system 2. If the unlocking password has been entered correctly, feedback is sent by the E-letter system 2 to the system 1 of the user indicating that the unlocking password is correct and a prompt to enter a new password is displayed in the browser of the user. Otherwise, feedback is sent by the E-letter system 2 to the browser of the user indicating that the unlocking password is not correct and the user is once again prompted to enter the unlocking password, whereby the procedure is aborted, for example, after three incorrect entries. If the entry of the unlocking password was successful, then the user can use his/her browser to enter a new password and to validate it. Subsequently, a new user password verifier is cryptographically derived from the new password, followed by the transmission of the user password verifier to the E-letter system, where the new user password verifier—which replaces the old user password verifier—is stored in a database. Now, a new user secret is cryptographically derived from the new password in the system 1 of the user and encrypted using the public key of the TrustCenter 3 and subsequently transmitted to the E-letter system 2. Then a request for key recovery with the user ID of the user is transmitted by the E-letter system 2 to Signtrust 3, where a hash value is derived from the user ID: Subsequently, the encrypted user master secret is sought using the hash value of the user ID in Signtrust 3 and, after having been found, it is decrypted with the user ID. The new user secret is decrypted in Signtrust 3 using the private key of Signtrust 3 and the user master secret is encrypted with the new user secret in Signtrust 3. Then the newly encrypted user master secret is transmitted by Signtrust 3 to the E-letter system 2, where it replaces the old encrypted user master secret. Finally, the newly encrypted user master secret is transmitted by the E-letter system 2 to the system 1 of the user.

Recipient master data can be stored in the E-letter system 2, whereby the public key is provided with a certificate in Signtrust 3, and this certificate, together with the encrypted user master secret, is forwarded by Signtrust 3 to the E-letter system 2, where is it stored in the recipient master data.

A secure key recovery procedure serves to ensure access to encrypted data by the user, also if the password is lost or changed. If the password is lost by the user, an unlocking password is sent to the user by mail. Once this unlocking password has been entered, the user has to enter a new password. A new user-specific secret, the new user secret, is derived from this password and, analogously to the initial provisioning, it is transmitted to the TrustCenter 3 in encrypted form. Since the private key is still stored in the TrustCenter 3, this key can be encrypted with the new user-specific secret, that is to say, the new user secret, and the previous data record in the customer data of the E-letter system 2 is overwritten. In case of merely a password change, the re-coding of the private key, that is to say, of the user master secret, is carried out in the system 1 of the user, and the encrypted data record in the customer data of the E-letter system 2 is overwritten with the new value. An involvement on the part of the TrustCenter 3 is not necessary.

The protection of professional secrets can relate to information that is sent in sensitive electronic letter attachments; message contents (body) usually contain a standardized letter to the recipient. The sensitive professional secrets are attached to electronic letters in the form of encrypted files. They can be present, for example, as PDF documents, but as a matter of principle, any other file format can be used. Encrypted attachments in a digital message that has been transmitted by means of secure transmission can be displayed according to the method shown in FIG. 4 in that the message is displayed in the browser of the user, whereby the user is informed that the message contains an attachment. The user requests the attachment from the E-letter system 2, after which the encrypted attachment is transmitted by the E-letter system 2 to the system 1 of the user. There, the encryption is recognized by the browser of the user, and the encrypted user master secret is requested from the database of the E-letter system 2. After the encrypted user master secret has been transmitted from the database of the E-letter system 2 to the system 1 of the user, the user master secret is decrypted with the user secret in the browser of the user, then the attachment is decrypted with the user master secret in the browser of the user, and the attachment is displayed in plain text in the browser of the user so that the decrypted message can be read.

As an alternative, however, the entire message can be encrypted. The decryption of such a message is described in FIG. 5. At first, only the unencrypted message header is displayed in the browser of the user. The message itself is identified as being encrypted, after which the encrypted user master secret from the user data is retrieved by the E-letter system 2. The user master secret is decrypted with the user secret in the browser of the user and then the message is decrypted with the user master secret and subsequently, the message itself is displayed in plain text.

Thus, the E-letter constitutes the transport medium for the messages, whereby the E-letter system 2 cannot access the recipient keys that have been used and therefore cannot read the protected attachments. This ensures that persons whose professions fall under the duty of confidentiality do not disclose their professional secrets to third parties, not even to the E-letter system 2. The requisite keys are generated by a TrustCenter 3, for example, Signtrust, as an independent third party. Here, no personally-identifiable information is transmitted to the TrustCenter 3. The association with the user is made exclusively via an ID that is anonymous to the TrustCenter 3, the user ID. The private key of the user, the user master secret, is encrypted with a user-specific secret before it is issued by the TrustCenter 3. The user-specific secret itself is transmitted to the TrustCenter 3 exclusively in encrypted form, whereby the encryption is carried out using a public key of the TrustCenter 3, for example, the Signtrust public key. The encrypted public key, the user master secret, is administered in the E-letter system 2 in the customer data. The user-specific secret is derived from the login password of the individual portal user in the system 1 of the user. Therefore, without knowledge of the login password, the secret cannot be reconstructed and the stored encrypted public key is thus protected against unauthorized access. A "zero knowledge password proof" protocol is used in order to authenticate the recipient at the E-letter system 2, that is to say, only a non-reconstructable cryptographic derivation of the key is transmitted to the E-letter system. Consequently, the E-letter system 2 cannot calculate the user secret.

The message or the attachment can be encrypted using an asymmetrical method or using a symmetrical method, whereby the use of an asymmetrical method normally makes higher demands on the capability of the computer employed. The E-letter system 2 provides its business customers with a service, namely, the address qualification ANQS. In this process, the business customer submits a list of mailing addresses to the E-letter system 2 and the latter looks in its customer master data for matches with the existing mailing addresses of its customers. In order to use an asymmetrical encryption method, an address in the form of that of an E-letter customer—together with the digital E-letter address of the customer and the certificate associated with him/her—is returned to the business customer when an address is identified as being that of an E-letter customer. Therefore, the business customer has the digital address and the key—in the form of the certificate—that is necessary for the encryption. He/she can validate this certificate with an eye towards its application purpose and its validity. Using the appertaining key of the recipient, the business customer encrypts all of the sensitive attachments of an E-letter. The business customer can submit—in the form of digital E-letters—the resulting set of mailings for which a key was determined on the basis of the mailing address. The business customer transmits the messages with the encrypted attachments to the E-letter system 2, from where the messages are delivered to the indicated recipient. The business customer receives confirmations that the messages were delivered as digital E-letters to the appertaining mailbox of the recipient. If a message is undeliverable, the sender receives notifications with the reason for the non-delivery such as, for example, account closed, mailbox full, etc. All E-letters, irrespective of the type of delivery and their contents, are associated in the E-letter system 2 with the recipient mailbox and stored under secure access in a database. In order to retrieve the messages, the user has to log in to the E-letter system 2 and has to open his/her inbox. Within the scope of the login procedure of the user, his/her user secret is calculated from the user password in his/her browser. An encrypted attachment is transmitted to the browser so that the browser retains a representation of the file in the main memory. The encrypted user master secret is retrieved from the customer master data and likewise held in the main memory. The encrypted user master secret is decrypted in the main memory of the browser with the user secret that was calculated during the login procedure. The encrypted file is decrypted with the user master secret that is now available and it is then displayed to the customer. For each recipient, an asymmetrical pair of keys of his/her own is generated and the public key is supplied to the sender in a certificate.

If an asymmetrical encryption method is to be used, then there is no non-sensitive counterpart in the sense of a public key. The user sender secret takes over the function of the public key with the certificate provided by the sender, whereby this user sender secret is calculated from the sender ID and from the user master secret that was stored for the submitted user ID. Making this user sender secret available is shown in FIG. 6. At the time of the first registration of a business customer as the sender of sensitive messages, he/she first creates a user name and a password. Moreover, he/she provides a sender public key. This data is transmitted by the system of the sender 4 to the E-letter system 2, where is it stored, for example, in a database. The E-letter system 2 assigns a sender ID to the new business customer and requests the TrustCenter 3 to generate a user sender secret from the sender public key, from the user ID and from the sender ID. In the TrustCenter 3, the user sender secret is calculated from the user master secret and from the sender ID, and encrypted using the sender public key. This encrypted user sender secret is subsequently forwarded via the electronic letter service 2 to the system 4 of the business customer. The user sender secret is established as a shared secret between the sender, that is to say the E-letter customer, and the recipient, that is to say, the E-letter portal user. The sender uses his/her sender private key to decrypt the user sender secret. Therefore, during the entire transmission procedure, the E-letter system 2 does not have access to the sender-specific and recipient-specific symmetrical keys.

Via a service of the electronic letter service, for example, the address qualification ANQS of the applicant, E-letter business customers can request the appertaining user sender secret. Here, the sender ID is automatically transmitted as an application-specific feature by the E-letter system 2. The E-letter customer can check the contained user sender secret by means of the digital signature included by Signtrust 3, thereby validating the authenticity of the key that has been provided. Consequently, the E-letter business customer can symmetrically encrypt and send information.

For the recipient, before the decryption of the symmetrically encrypted message, the user sender secret has to be derived from the user master secret and from the sender ID that was supplied along with the message as meta data. Here, the cryptographic derivation is carried out analogously to the provision of the user sender secret in the TrustCenter. Since the user sender secret is only reconstituted within the sphere of control of the recipient, it is never present in decrypted form in the electronic letter service. Consequently, the method likewise meets the prerequisites for message transmission for persons whose professions fall under the duty of confidentiality.

The embodiments shown here constitute merely examples of the present invention and therefore must not be construed in a limiting fashion. Alternative embodiments considered by the person skilled in the art are likewise encompassed by the scope of protection of the present invention.

LIST OF REFERENCE NUMERALS 1 browser of the user
2 electronic letter service, E-letter system
3 TrustCenter, Signtrust
4 system of the sender Captions to the Figures

FIG. 1

AA first-time registration of user
BB creation of password
CC cryptographic derivation of user password verifier from password
DD cryptographic derivation of user secret from password
EE encryption of user secret using public key of TrustCenter
FF storing of user password verifier
GG key generation request
HH storing of user ID and of user master secret encrypted with user secret
II initialization of key concluded
JJ decryption of user secret
KK generation of user master secret
LL generation of user ID
MM encryption of user master secret with user secret
NN encryption of user master secret with user ID
OO derivation of hash value from user ID
PP storing of encrypted user master secret and hash value of the user ID
QQ deletion of the unencrypted user master secret and of the user ID
RR key encryption concluded

FIG. 2

AA change password
BB enter new password
CC validate new password
DD cryptographic derivation of user password verifier from new password
EE retrieve encrypted user master secret
FF cryptographic derivation of new user secret from new password
GG decrypt user master secret with old user secret
HH encrypt user master secret with new user secret
II replace the old user password verifier
JJ issuing encrypted user master secret
KK replace encrypted user master secret
LL password change concluded

FIG. 3

AA receive unlocking password
BB login with unlocking password
CC enter new password
DD validate new password
EE cryptographic derivation of user password verifier from new password
FF cryptographic derivation of new user secret from new password
GG encryption of new user secret using public key in TrustCenter
HH key recovery concluded
II check unlocking password
  correct
  not correct
JJ replace old user password verifier
KK user is unlocked
LL request for key recovery with user ID
MM storing the newly encrypted user master secret
NN derivation of hash value from user ID
OO search for encrypted user master secret using hash value of user ID
PP decrypt user master secret with user ID
QQ decrypt new user secret with private key in TrustCenter
RR encrypt user master secret with new user secret
SS transmission of newly encrypted user master secret

FIG. 4

AA inbox, user secret is available
BB open message
CC display message
DD open attachment
EE identify attachment as being encrypted
FF decrypt user master secret with user secret
GG decrypt attachment with user secret
HH display attachment
II decrypted message read
JJ retrieve message
KK retrieve attachment
LL retrieve encrypted user master secret from user data

FIG. 5

AA inbox, user secret is available
BB open message
CC display message header
DD identify attachment as being encrypted
EE decrypt user master secret with user secret
FF decrypt message with user master secret
GG display message
HH decrypted message read
II retrieve message
JJ retrieve encrypted user master secret from user data

FIG. 6

AA first-time registration, business customer
BB creation of password
CC provision of sender public key
DD storing encrypted user sender secret
EE storing user name, password and sender public key FF assignment of sender ID
GG request to generate a user sender secret from the sender public key, user ID, sender ID
HH transmission of encrypted user sender secret
II derivation of hash value from user ID
JJ search for encrypted user master secret using hash value of user ID
KK decryption of user master secret with user ID
LL calculation of user sender secret from user ID and from sender ID
MM decryption of user sender secret using sender public key
NN transmission of encrypted user sender secret

The invention claimed is:

1. A method for securely transmitting a digital message by means of an electronic letter service, whereby a user of the service has a system with a computer with a functioning browser running on it as well as an Internet connection, and the electronic letter service makes use of a TrustCenter, whereby an asymmetrical encryption method is installed on the TrustCenter,
characterized by the following steps
the user creates a password, making use of the system of the user;
a user password verifier is cryptographically derived from the password;
the user password verifier is transmitted to the electronic letter service and the user password verifier is stored on a storage medium of the electronic letter service;
a user secret is cryptographically derived from the password;
the user secret is encrypted using a public key of the TrustCenter;
the encrypted user secret is transmitted to the electronic letter service;
the encrypted user secret is transmitted from the electronic letter service to the TrustCenter, whereby the electronic letter service sends to the TrustCenter a function call for a generation of a user master secret;
the user secret is decrypted in the TrustCenter;
the user master secret is generated in the TrustCenter;
a user ID is generated in the TrustCenter;
the user master secret is encrypted with the user secret in the TrustCenter;
the user ID as well as the user master secret encrypted with the user secret are transmitted from the TrustCenter to the electronic letter service; and
the user ID and the user master secret encrypted with the user secret are stored in the electronic letter service.

2. The method for securely transmitting a digital message by means of an electronic letter service according to claim 1, characterized in that
after the encryption of the user master secret with the user secret in the TrustCenter, the user master secret is encrypted with the user ID in the TrustCenter; subsequently,
a hash value is derived from the user ID in the TrustCenter;
after this, the encrypted user master secret and the hash value derived from the user ID are stored in the TrustCenter; and subsequently,
the unencrypted user master secret and the user ID are deleted in the TrustCenter.

3. The method according to claim 1, characterized in that the electronic letter service is accessible via a portal on the Internet, whereby the portal provides a login mask into which a user name and a user password can be entered.

4. The method according to claim 1, characterized in that the transmission of a user name and of the user password verifier from the system of the user to the electronic letter service is carried out by means of a challenge-response-based method.

5. The method according to claim 4, characterized in that the transmission of the user name and of the user password verifier from the system of the user to the electronic letter service is carried out by means of an SRP (Secure Remote Password) method.

6. A method for a password change for securely transmitting a digital message by means of an electronic letter service according to claim 1, characterized by the following steps
the user enters a new password, making use of the system of the user;
the user validates the new password, making use of the system of the user;
the user password verifier is cryptographically derived from the new password;
the user password verifier is transmitted to the electronic letter service and stored on a storage medium of the electronic letter service, a process in which an old user password verifier is replaced;
the encrypted user master secret is retrieved by the electronic letter service;
the encrypted user master secret is transmitted by the electronic letter service to the system of the user;
a new user secret is cryptographically derived from the new password;
the user master secret is decrypted with an old user secret;
the user master secret is encrypted with the new user secret;
the newly encrypted user master secret is transmitted to the electronic letter service;
the newly encrypted user master secret is stored on a storage medium of the electronic letter service, a process in which an old user master secret is replaced.

7. The method for resetting the password for securely transmitting a digital message by means of an electronic letter service according to claim 1, characterized by the following steps
the user requests an unlocking password;
an unlocking password is cryptographically generated in the electronic letter service;
a cryptographic unlocking password is delivered to the user by regular mail;
the user logs in to a portal of the electronic letter service with the unlocking password;
the unlocking password is transmitted to the electronic letter service;
the unlocking password is checked in the electronic letter service;
if the unlocking password has been entered correctly, feedback is sent by the electronic letter service to the system of the user indicating that the unlocking password is correct, and a prompt to enter a new password is displayed, otherwise, feedback is sent by the electronic letter service to the system of the user indicating that the unlocking password is not correct and the procedure returns to the step in which the user is prompted to enter the unlocking password, whereby the procedure is aborted after three incorrect entries;
the new password is entered by the user, making use of his/her browser;

the new password is validated by the user, making use of his/her browser;

a new user password verifier is cryptographically derived from the new password;

the user password verifier is transmitted to the electronic letter service and stored on a storage medium of the electronic letter service, a process in which the old user password verifier is replaced;

a new user secret is cryptographically derived from the new password in the browser of the user;

the new user sender secret is encrypted using the public key of the TrustCenter;

the encrypted user sender secret is transmitted to the electronic letter service a request for key recovery with the user ID of the user is sent by the electronic letter service to the TrustCenter;

a hash value is derived from the user ID in the TrustCenter;

the encrypted user master secret is sought using the hash value of the user ID in the TrustCenter;

after having been found, the encrypted user master secret is decrypted with the user ID in the TrustCenter;

the new user secret is decrypted in the TrustCenter using the private key of the TrustCenter;

the user master secret is encrypted with the new user secret in the TrustCenter;

the newly encrypted user master secret is transmitted by the TrustCenter to the electronic letter service;

the encrypted user master secret is replaced in the electronic letter service;

the newly encrypted user master secret is transmitted by the electronic letter service to the system of the user.

8. A method for displaying encrypted attachments in a digital message that has been transmitted by means of a secure transmission according to claim 1, characterized by the following steps the message is displayed in the browser of the user, whereby the user is informed that the message contains an attachment;

the user requests the attachment from the electronic letter service;

the encrypted attachment is transmitted by the electronic letter service to the system of the user;

the encryption is recognized by the browser of the user and the encrypted user master secret is requested from the storage medium of the electronic letter service;

the encrypted user master secret is transmitted from the storage medium of the electronic letter service to the system of the user;

the user master secret is decrypted with the user secret in the browser of the user;

the attachment is decrypted with the user master secret in the browser of the user;

the attachment is displayed in plain text in the browser of the user.

9. A method for displaying a digital encrypted message that has been transmitted by means of a secure transmission according to claim 1, whereby the encrypted message contains an unencrypted message header, characterized by the following steps the message header is displayed in the browser of the user, whereby the user is informed that the message itself is encrypted;

the encrypted user master secret is requested from the storage medium of the electronic letter service;

the encrypted user master secret is transmitted from the storage medium of the electronic letter service to the system of the user;

the encrypted user master secret is decrypted with the user secret in the browser of the user;

the message with the user master secret is decrypted in the browser of the user; and the message is displayed in plain text in the browser of the user.

10. The method for securely transmitting a digital message by means of an electronic letter service according to claim 1, characterized in that a sender encrypts the digital message while it is still within his/her sphere of control, the encrypted document is transmitted in encrypted form to the recipient on his/her system, where it is decrypted.

11. The method for securely transmitting a digital message by means of an electronic letter service according to claim 1, characterized in that the public key is provided with a certificate in the TrustCenter, and this certificate, together with the encrypted user master secret, is forwarded by the TrustCenter to the electronic letter service, where is it stored in recipient master data.

12. The method for securely transmitting a digital message by means of an electronic letter service according to claim 2, characterized in that a sender encrypts the digital message using the public key of a recipient.

13. The method for securely transmitting a digital message by means of an electronic letter service according to claim 11, whereby the sender creates a user name and a password, characterized in that the sender provides a sender public key that, together with his/her user name and password, is transmitted to the electronic letter service, whereby the electronic letter service assigns a sender ID to the sender and transmits the sender public key, the user ID and the sender ID to the TrustCenter, where a user sender secret is calculated from the sender ID and from the user master secret that was stored for the submitted user ID, and subsequently encrypted using the sender public key, whereby the encrypted user secret is transmitted to the electronic letter service, and from there, to the system of the sender.

14. The method for securely transmitting a digital message by means of an electronic letter service according to claim 7, characterized in that a sender encrypts the digital message with the user sender secret.

15. The method for securely transmitting a digital message by means of an electronic letter service according to claim 13, characterized in that the sender ID as meta data, along with the encrypted message, is supplied by the system of the sender to the system of the recipient, where the user sender secret is derived from the user master secret and from the sender ID, so that the message can subsequently be decrypted with it.

* * * * *